US009430840B1

(12) United States Patent
Tian et al.

(10) Patent No.: US 9,430,840 B1
(45) Date of Patent: Aug. 30, 2016

(54) METHOD AND SYSTEM FOR SEGMENTING AN IMAGE BASED ON MOTION VANISHING POINTS

(71) Applicant: Mitsubishi Electric Research Laboratories, Inc., Cambridge, MA (US)

(72) Inventors: Dong Tian, Boxborough, MA (US); Jiun-Yu Kao, Somerville, MA (US); Hassan Mansour, Boston, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/806,778

(22) Filed: Jul. 23, 2015

(51) Int. Cl.
*G06K 9/62* (2006.01)
*G06T 7/00* (2006.01)
*G06K 9/52* (2006.01)
*G06K 9/46* (2006.01)
*G06K 9/00* (2006.01)

(52) U.S. Cl.
CPC ......... *G06T 7/0083* (2013.01); *G06K 9/00624* (2013.01); *G06K 9/4604* (2013.01); *G06K 9/52* (2013.01)

(58) Field of Classification Search
CPC ........... G06K 9/6218; G06K 9/00711; G06K 9/6217; G06K 9/00718; G06K 2209/01; G06T 7/0081; G06T 7/0083; G06T 2207/20144; G06T 2207/10016; G06F 17/3072
See application file for complete search history.

(56) References Cited

U.S. PATENT DOCUMENTS 8,290,209 B2 10/2012 Akita et al.
8,379,931 B2* 2/2013 Tojo ............... G06K 9/00295 382/107
8,705,868 B2* 4/2014 Osako ............. G06K 9/4604 382/199
8,798,387 B2* 8/2014 Yamada ............. H04N 5/23254 382/254
8,837,811 B2* 9/2014 Sinha ................. G06T 7/0042 382/100
9,105,103 B2* 8/2015 Holz ................. G06T 7/2046
9,129,161 B2* 9/2015 Agosta ............. G06K 9/00791
2010/0027844 A1* 2/2010 Akita .................. G06T 7/2066 382/103
2010/0188584 A1* 7/2010 Liu .................... G06T 7/0051 348/699
2012/0281922 A1* 11/2012 Yamada ............. H04N 5/23254 382/201
2015/0130953 A1 5/2015 Mansour et al.

OTHER PUBLICATIONS

Robert C Bolles and H Harlyn Baker. Epipolar-plane image analysis: A technique for analyzing motion sequences. Readings in Computer Vision: Issues, Problem, Principles, and Paradigms, p. 26, 2014.

(Continued)

*Primary Examiner* — Amir Alavi
(74) *Attorney, Agent, or Firm* — Gene Vinokur; James McAleenan; Hironori Tsukamoto

(57) ABSTRACT

A method segments an image acquired by a sensor of a scene by first obtaining motion vectors corresponding to the image and generating a motion vanishing point image, wherein each pixel in the motion vanishing point image represents a number of intersections of pairs of motion vectors at the pixel. In the motion vanishing point image, a representation point for each motion vector is generated and distances between the motion vectors are determined based on the representation points. Then, a motion graph is constructed wherein each node represents a motion vector, and each edge represents a weight based on the distance between the nodes. Graph spectral clustering is performed on the motion graph to produce segments of the image.

14 Claims, 6 Drawing Sheets

(56) References Cited

OTHER PUBLICATIONS

Branislav Micusik and Tomas Pajdla. Estimation of omnidirectional camera model from epipolar geometry. In Computer Vision and Pattern Recognition, 2003. Proceedings. 2003 IEEE Computer Society Conference on, vol. 1, pp. 1-485. IEEE, 2003.

Fuyuan Xu, Guohua Gu, Kan Ren, and Weixian Qian. Motion segmentation by new three-view constraint from a moving camera. Mathematical Problems in Engineering, 2015.

Antoni B Chan and Nuno Vasconcelos. Modeling, clustering, and segmenting video with mixtures of dynamic textures. Pattern Analysis and Machine Intelligence, IEEE Transactions on, 30(5):909-926, 2008.

Ehsan Elhamifar and René Vidal. Sparse subspace clustering: Algorithm, theory, and applications. Pattern Analysis and Machine Intelligence, IEEE Transactions on, 35(11):2765-2781, 2013.

Peter Ochs and Thomas Brox. Higher order motion models and spectral clustering. In Computer Vision and Pattern Recognition (CVPR), 2012 IEEE Conference on, pp. 614-621. IEEE, 2012.

Gary J Sullivan, J-R Ohm, Woo-Jin Han, and Thomas Wiegand. Overview of the high efficiency video coding (hevc) standard. Circuits and Systems for Video Technology, IEEE Transactions on, 22(12):1649-1668, 2012.

Gabriel J Brostow, Jamie Shotton, Julien Fauqueur, and Roberto Cipolla. Segmentation and recognition using structure from motion point clouds. In Computer Vision—ECCV 2008, pp. 44-57. Springer, 2008.

D.I. Shuman, S.K. Narang, P. Frossard, A. Ortega, and P. Vandergheynst. The emerging field of signal processing on graphs: Extending highdimensional data analysis to networks and other irregular domains. Signal Processing Magazine, IEEE, 30(3):83-98, 2013.

Andrew Y. Ng, Michael I. Jordan, and Yair Weiss. On spectral clustering: Analysis and an algorithm. In Advances in Neural Information Processing Systems, pp. 849-856. MIT Press, 2001.

J. A. Hartigan and M. A. Wong. Algorithm as 136: A k-means clustering algorithm. Journal of the Royal Statistical Society. Series C (Applied Statistics), 28(1):pp. 100-108, 1979.

\* cited by examiner

METHOD AND SYSTEM FOR SEGMENTING AN IMAGE BASED ON MOTION VANISHING POINTS

FIELD OF THE INVENTION

This invention relates generally to the field of image processing, and more particularly to segmenting an image acquired of a scene by a sensor using motion vectors.

BACKGROUND OF THE INVENTION

Motion is an important cue for image segmentation tasks considering the fact that parts of a rigid object often exhibit similar motions over time. In particular, it is often desirable to segment objects having different motions in an image, or sequence of images (video) acquired of a scene.

Epipolar plane image (EPI) analysis assumes that an image is composed of homogeneous regions bounded by straight lines no matter what shape, texture or intensity changes are contained in the image. Such observations have been utilized to construct 3D geometric description of a static scene from a video sequence, see Bolles et al., "Epipolar-plane image analysis: A technique for analyzing motion sequences," Readings in Computer Vision: Issues, Problem, Principles, and Paradigms, page 26, 2014.

Epipolar geometry is an intrinsic projective geometry between two images that can be used for motion segmentation, see Micusik et al., "Estimation of omnidirectional camera model from epipolar geometry," Computer Vision and Pattern Recognition, 2003. Proceedings. 2003 IEEE Computer Society Conference on, volume 1, pages 1-485. IEEE, 2003. One limitation of using two images is that the motion within the epipolar plane cannot be detected. To overcome this limitation, epipolar constraints can be extended to three images. For example, a three-view epipolar constraint called "parallax-based multiplanar constraint" can be used to classify each image pixel as either belonging to a static background or to objects moving in the foreground, see Xu et al., "Motion segmentation by new three-view constraint from a moving camera," Mathematical Problems in Engineering, 2015.

Another approach for motion segmentation uses dynamic textures analysis based on a spatio-temporal generative model for video, which represents video sequences as observations from a linear dynamical system. Another method uses mixtures of dynamic textures as a representation for both appearance and dynamics of a variety of visual processes, see Chan et al., "Modeling, clustering, and segmenting video with mixtures of dynamic textures," Pattern Analysis and Machine Intelligence, IEEE Transactions on, 30(5):909-926, 2008. However, that approach suffers in the presence of strong perspective effects because there is no accounting for the epipolar geometry of the scene.

Sparse subspace clustering (SSC) has been used for motion segmentation, see Elhamifar et al., "Sparse subspace clustering: Algorithm, theory, and applications," Pattern Analysis and Machine Intelligence, IEEE Transactions on, 35(11):2765-2781, 2013. In SSC, trajectories of feature points are extracted from video frames. Sparse optimization is used to find trajectory associations by estimating each feature trajectory using a sparse linear combination of other feature trajectories. Sparse weights are used to construct a graph that relates the features, and graph spectral clustering is used to segment the features that occupy the same subspace. The limitation of that approach is its reliance on computing trajectories across multiple images. Moreover, the computational complexity of the sparse optimization problem quickly increases as the number of feature points increase.

In a related approach, a "hypergraph" is constructed based on similarities defined on higher order tuples, rather than pair of nodes, see Ochs et al., "Higher order motion models and spectral clustering," Computer Vision and Pattern Recognition (CVPR), 2012 IEEE Conference on, pages 614-621. IEEE, 2012.

Yet another approach for motion segmentation relies on a variation of robust principal component analysis (RPCA) where a moving background is separated from moving foreground objects, see U.S. 20150130953, "Method for Video Background Subtraction Using Factorized Matrix Completion," Mansour et al. Motion vectors can be used to align images to the same perspective before applying RPCA to extract a low-rank background from sparse moving foreground objects. One limitation of that scheme is that the background alignment assumes that objects are in the same depth plane, which may not necessarily be true. Another limitation is that the technique requires multiple images to produce an accurate segmentation.

In summary, a common limitation observed with conventional methods is their inability to deal with complex motion, especially when strong perspective effects appear in the scene.

Based on an assumption that the optical flow of an object share one focus of expansion (FOE) point, one motion segmentation method extracts feature points, e.g., Kanade-Lucas-Tomasi (KLT) feature points, generates an optical flow (motion field), e.g., using template matching, and then groups the motion, e.g., using a Random Sample Consensus (RANSAC) approach, see U.S. Pat. No. 8,290,209, Akita et al. In particularly, the RANSAC approach can be applied in a x-$MV_x$ and y-$MV_y$ plane, where any two points are connected with a straight line, the number of points lying within a tolerance of the straight line is counted, and a straight line having the greatest number of points is selected. The points on the selected straight line with the tolerance are segmented as one group of motion.

SUMMARY OF THE INVENTION

Motion segmentation identifies coherent relationships between pixels in images that are associated with motion vectors. However, perspective differences can often deteriorate the performance of conventional motion segmentation techniques.

The embodiments of the invention provide a method and system for motion segmentation that uses a motion vectors to identify motion representations based on motion vanishing points. Segmentation is achieved using graph spectral clustering where a graph is constructed using the motion representation distances defined in the motion vanishing point image associated with the image pixels.

DETAILED DESCRIPTION OF THE PREFERRED EMBODIMENTS

The embodiments of the invention provide a method and system for segmenting an image based on motion vectors (MVs) acquired of a scene by a sensor. In one embodiment, the motion vectors are acquired from a bitstream encoding the image.

1 Motion Vanishing Point in an Image Plane 1.1 Motion Vanishing Point

A geometric vanishing points can be used for many tasks, e.g., to infer information about three-dimensional (3D) structures. There are three geometric vanishing points along three orthogonal directions (x,y,z) of a 3D world coordinate system.

We are interested in a motion vanishing point. Unlike geometric vanishing points, which are derived from lines in an image of a scene, motion vanishing points exist at intersections of the MVs.

Figure 1:
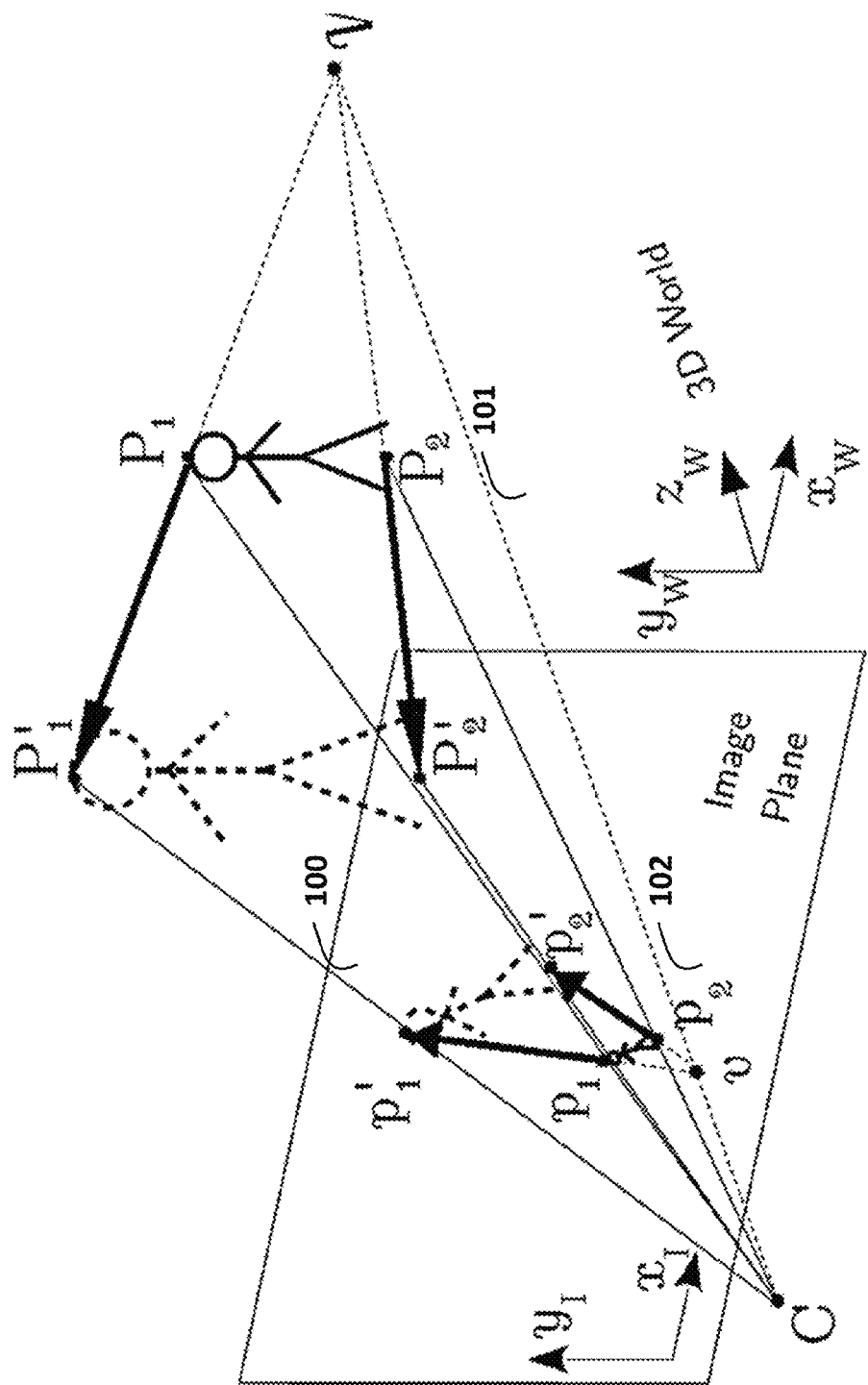
FIG. 1 is a schematic of a motion vanishing point in a 3D world coordinate system and an image coordinate system used by embodiments of the invention.

The schematic in FIG. 1 shows the concept of a motion vanishing point v. In the 3D world coordinate system 101, consider a point on an object 100 (represented by stick figure) is moving from $P_1$ to $P_1'$ with a corresponding motion vector $P_1 \rightarrow P_1'$. Similarly, the motion of another point on the same object is represented by $P_2 \rightarrow P_2'$. Because of the perspective effect, the pairs $P_1 \rightarrow P_1'$ and $P_2 \rightarrow P_2'$ intersects at vanishing point V at an infinite distance in the 3D world coordinate system.

For a projection of these motions onto the image plane 102 of a camera with camera center at C, the corresponding motion vectors are $p_1 \rightarrow p_1'$ and $p_2 \rightarrow p_2'$ in the image plane. The pair of motion vectors intersect at the motion vanishing point v. It can be seen that the motion of all points on the same object share the same motion vanishing point v in the image plane similar to the way the vectors share the same motion vanishing point V in the 3D world coordinate system.

Therefore, the distances between motion vanishing points can be used to distinguish different moving objects, and group pixels from one object even when parts of the object have motions in different directions due to the perspective effect.

In some cases, the motion vanishing point can be co-located with the geometric vanishing point along the z-axis. For example, when the camera moves along the z-axis and there is no motion in the scene, except for the global motion, the motion vectors of all pixels share the same motion vanishing point, and it is exactly the location of geometric vanishing point in the z direction. In such cases, it can be beneficial to use the motion vanishing point to detect the geometric vanishing point, especially when there are no strong lines in the image or the lines have random directions.

To complete the concept of the motion vanishing point, our framework also consider the case of lateral movement, that is, the motion of the object in the 3D world is parallel to the image plane. In such a case, the projected motions onto the image plane are parallel, and the motion vanishing point is at an infinite distance from the origin of the image plane with a motion direction θ relative to x-axis. Therefore, the motion vanishing points in the image plane does not necessarily always fall within the range of the image.

1.2 Motion Vanishing Point Image

In one embodiment, we extract motion vectors $MV_i$ from a video bitstream coded by an H.265/HEVC or similar encoder. Then, we segment the image based on the motion vectors.

We generate a motion vanishing point image V by plotting the motion vanishing point $v_{ij}$ between $MV_i$ and $MV_j$ for $\forall i,j: i \neq j$. Examples of motion vanishing point images are shown in FIGS. 2A, 2B and 2C for corresponding images 2D, 2E and 2F acquired by a sensor mounted on a moving vehicle. In various embodiments, the sensor can be a camera, a depth sensor or combinations thereof The pixel at a location (x,y) in V represents a number of pairs of motion vectors (i,j) sharing the same vanishing point at (x,y). A darker color at (x,y) in the vanishing point image 2A indicates the presence of motion vanishing points. When the car moves directly forward and there are no other moving objects in the image, the vanishing points concentrate around a single motion center 201. This is also an example when a geometric vanishing point co-locates with the motion vanishing point.

Figure 2D:
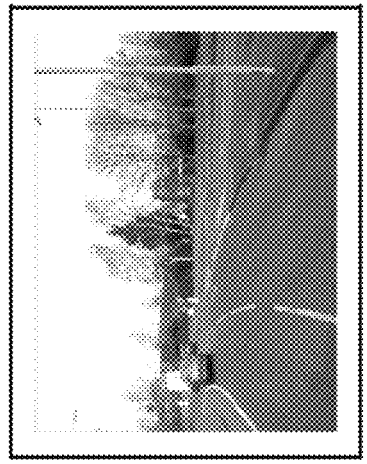
FIGS. 2A, 2B and 2C illustrate motion vanishing point images corresponding to pixel images 2D, 2E, and 2F, respectively.
Figure 2E:
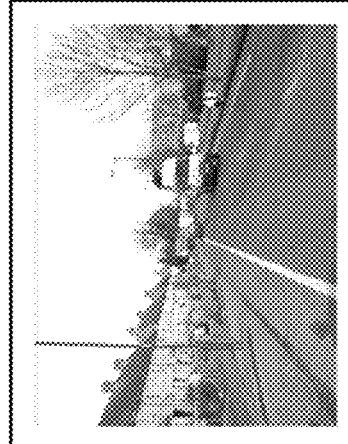
Figure 2F:
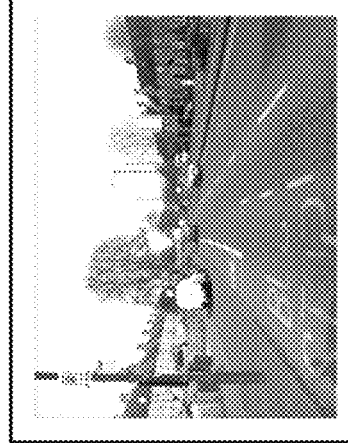
Figure 2A:
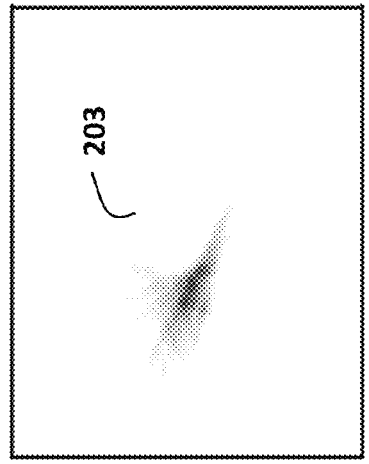
Figure 2B:
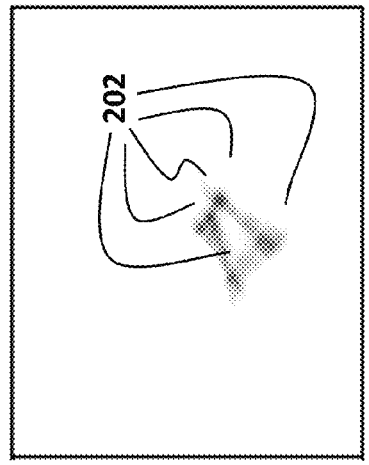
Figure 2C:
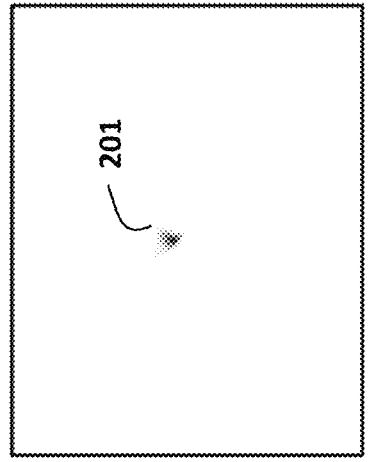

When there are more than one motions in the scene, e.g. the car exhibits rolling motion or there are multiple moving objects appearing in the scene, such as an oncoming vehicle in FIG. 2E, the vanishing point image 2B has multiple convergence points 202. Similarly, when the car veers left in FIG. 2F, the vanishing point image in FIG. 2C exhibits a sharper round boundary 203. Thus, there is a relationship between the motion statistics and the vanishing point image. Some motion vanishing points can fall outside the image range making the motion vanishing point image larger than pixel image.

Although it is possible to do motion segmentation directly in the motion vanishing point image, e.g., using k-means clustering, we use the vanishing point image to construct a graph and perform graph spectral clustering to segment the image.

2 Graph Spectral Motion Segmentation 2.1 Graph Spectral Clustering

In general graph signal processing, an undirected graph G=(V,E) includes a set of nodes V={1, 2, ..., N} connected by a set of edges E={(i,j,$w_{ij}$)}, i,j∈ V where (i,j,$w_{ij}$) denotes the edge between nodes i and j having weight $w_{ij}$. In the preferred embodiments, the weights are based on distances between motion vectors.

To perform the motion segmentation using the motion vectors, each MV is treated as a node in the graph. Each motion vector can represent a single pixel of a block of, e.g., 4×4 pixels. An adjacency matrix W of the graph is an N×N matrix with weights $w_{ij}$, and a degree $d_i$ of a node i is a sum of the weights of edges connected to node i. A degree matrix is the diagonal matrix $$D := \text{diag}\{d_1, d_2, \ldots, d_N\},$$

and a combinatorial Laplacian matrix is $\mathcal{L} := D - W$.

A normalized Laplacian matrix is defined as L: $=D^{-1/2} \mathcal{L} D^{-1/2}$, which is a symmetric positive semi-definite matrix. Hence, an eigendecomposition is $L = U \Lambda U^t$, where U= $\{u_1, \ldots, u_N\}$ is an orthogonal set of eigenvectors and $\Lambda = \text{diag}\{\lambda_1, \ldots, \lambda_N\}$ is a corresponding eigenvalue matrix. The eigenvectors and eigenvalues of the Laplacian matrix provide a spectral interpretation of the graph signals. Note that the eigenvalues $\{\lambda_1, \ldots, \lambda_N\}$ can be treated as graph spectral frequencies and are always situated in an interval

[0,2] on a real line. The eigenvalues are sorted in a non-decreasing order, i.e. $0=\lambda_1\lambda_2 \ldots \lambda_N$.

The principle eigenvectors, e.g., the eigenvectors among the first K eigenvectors $\{u_1, u_2, \ldots, u_K\}$ after removing the eigenvectors corresponding to zero eigenvalues, can be used to cluster the pixels into k groups. We use k-means clustering for the rows of the principal eigenvectors.

We use the graph spectral clustering for performing motion segmentation after constructing the graph as described below.

2.2 Graph Construction for Motion Segmentation

We construct the graph based on the motion vanishing points. We consider a sparse graph connectivity where every MV (associated with one or a block of pixels) is connected to its spatial neighboring MVs, e.g. 4 or 8 immediate spatial neighboring MVs. This topology can represent local changes of the motion field in the graph.

Figure 3:
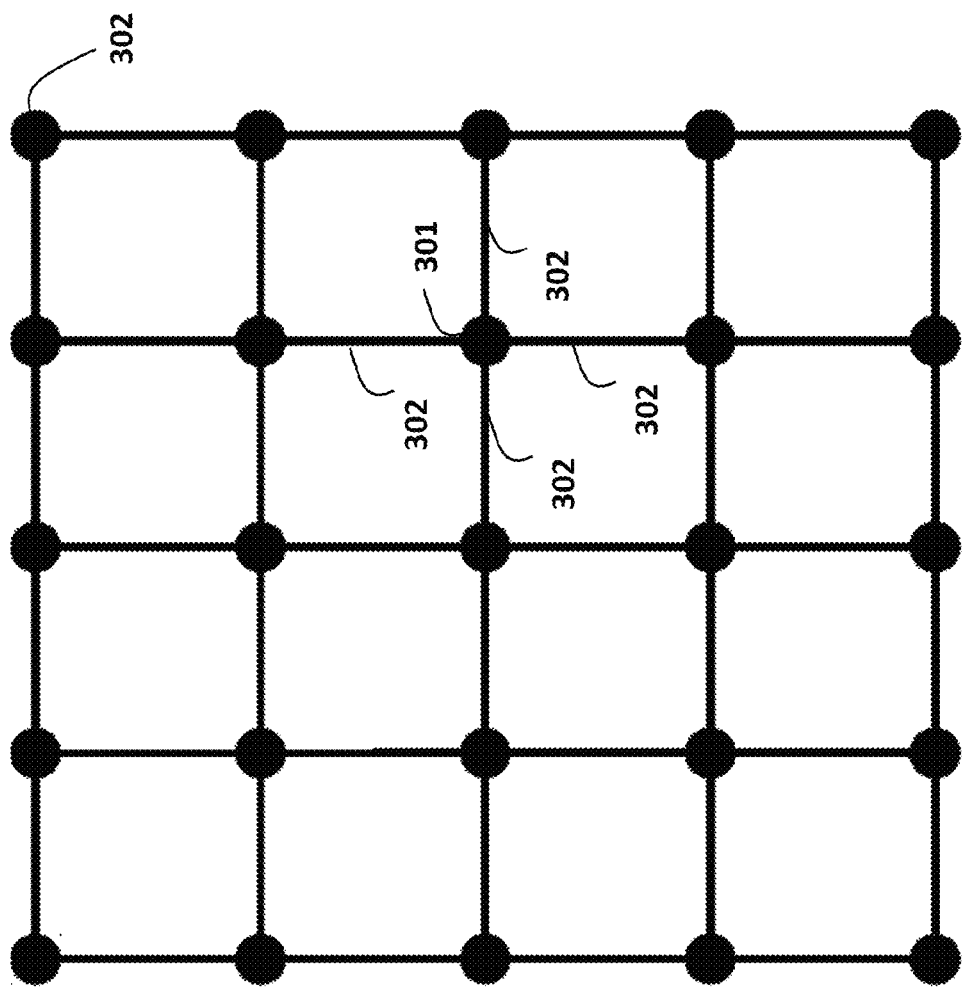
FIG. 3 is a schematic of a 4-connected graph according to embodiments of the invention.

FIG. 3 shows an example graph where nodes 301 are connected to four spatial neighboring nodes by edges 302. Other graph topologies can also be used.

2.2.1 Representation Point of a MV

Unlike conventional approaches for image processing. where the graph weights are often determined from the pixel intensities, we use locations of the vanishing points associated with the MVs to construct the graph weights.

Figure 4:
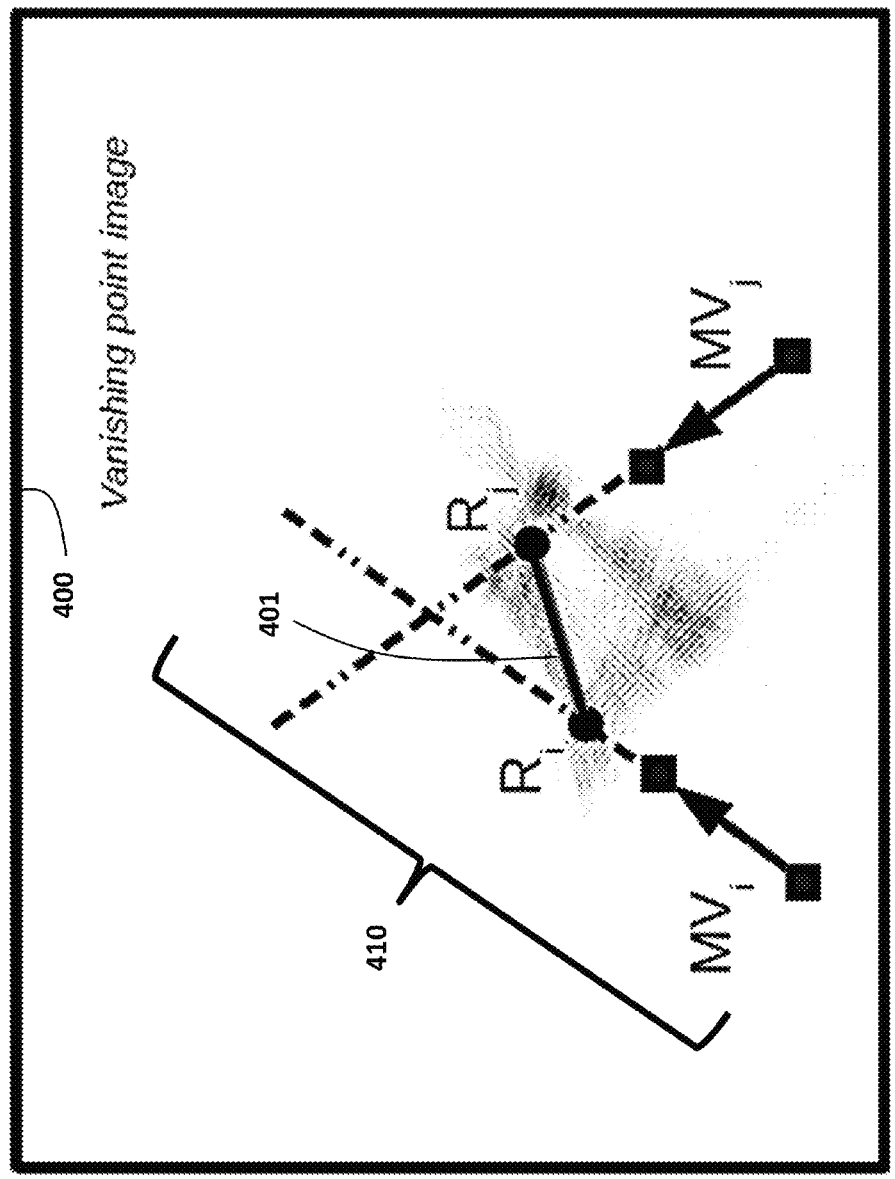
FIG. 4 is a schematic of a representation point of a motion vector (MV) and a distance between two of MVs in a motion vanishing point image.

In one embodiment, for each MV, we select a single representation point, which corresponds to a location along a ray of the motion vector that has a maximal number of intersections in the motion vanishing point image V. The ray can be thought of as an extension of the vector in the same direction as the MV but with an infinite magnitude FIG. 4 shows the process of selecting a representation point $R_i$ for a motion vector $MV_i$. FIG. 4 also shows the $MV_i$ and the corresponding ray 410 by extending $MV_i$. For a zero length MV, the representation points R is co-located with spatial location of the pixel in the image.

In one embodiment, for each MV, we select a representation point set $\mathcal{R}$ of candidate representation points on the motion vector ray. For each candidate representation point in $\mathcal{R}$, an assigned probability indicates a likelihood the a true vanishing point is associated with the object and the MV.

Because the motion vanishing point image can be larger than the image being processed, the representation point can be outside of the image range. For images of scenes with strong perspective effects, we can adjust the representation points to be within the image range without reducing accuracy.

2.2.2 Perspective Distances Between Two MVs

Based on the set of representation points, we measure the distance between two motion vectors using the distance between their corresponding representation points in the motion vanishing point image.

In FIG. 4 with a single representation point, a perspective distance 401 between $MV_i$ and $MV_j$ is $$d_{p,ij}=\|R_i-R_j\|=\sqrt{(R_{xi}-R_{xj})^2+(R_{yi}-R_{yj})^2}, \quad (1)$$

where $(R_{xi}, R_{yi})$ is the location of the representation point of $MV_i$.

In embodiment where a representation point set is in force, the perspective distance between two motion vectors is $$d_{p,ij} = \sum_{\forall m,n} p(R_{im})p(R_{jn})\|R_{im} - R_{jn}\|, \quad (2)$$

where $p(R_{im})$ is the probability for $R_{im}$ to a motion vanishing point. This satisfies the following constraint, $$\sum_{\forall m} p(R_{im}) = 1. \quad (3)$$

Under certain circumstances, the perspective distance can be used to define the edge weights to achieve perspective invariant motion segmentation. Therefore, we set the distance to be a weighted sum of the perspective distance $d_{p,ij}$ and the Euclidean distance $d_{m,ij}$ between the motion vectors, $$d_{ij}=w_p d_{p,ij}+(1-w_p)d_{m,ij}. \quad (4)$$

The graph adjacency matrix $W=\{w_{ij}\}$ is, $$W_{ij}=e^{-\beta*d_{ij}}+\epsilon. \quad (5)$$

where $\beta$ and $\epsilon$ are predetermined constants.

2.2.3 Perspective Distances from Parallel MVs

When the perspective effect is weak, MVs from one object tend to be nearly parallel to each other. Parallel motion also happens with lateral movements, that is, the object is moving along a direction that is parallel to the image plane. In such cases, the representation point $R_i$ is at $(\theta, \infty)$ which is outside the image range, i.e., at an infinite distance from the origin of the image plane and an angle $\theta$.

If both the motion representation points of motion vectors $MV_i$ and $MV_j$ are outside the image range, then the distance is a difference in the motion directions $$d_p=|\theta_i-\theta_j|. \quad (6)$$

If only one of the MVs has a representation point that falls outside the image range, then the distance has a maximal value, for example, $$d_p=\sqrt{width^2+height^2}, \quad (7)$$

where width and height represent the resolution of the image, because the MVs are associated with different objects. Equations (7) can be altered accordingly when the range of the representation point is larger than the image range.

2.2.4 Perspective Distances from Pixels with Motion Absent

In a practical system, some pixels do not have associated motion information when the pixels are coded in Intra prediction modes, rather than Inter prediction modes by an H.265/HEVC encoder. The pixels without motion information are called hole pixels. In one embodiment, we use a conventional in-painting method to fill missing motion vectors (holes).

In another embodiment, the graph topology construction is the same, i.e., the nodes are connected whether or not the motion is available. Because the holes are typically caused by disocclusions from motion and they appear around object boundaries, we use the following procedure.

Figure 5:
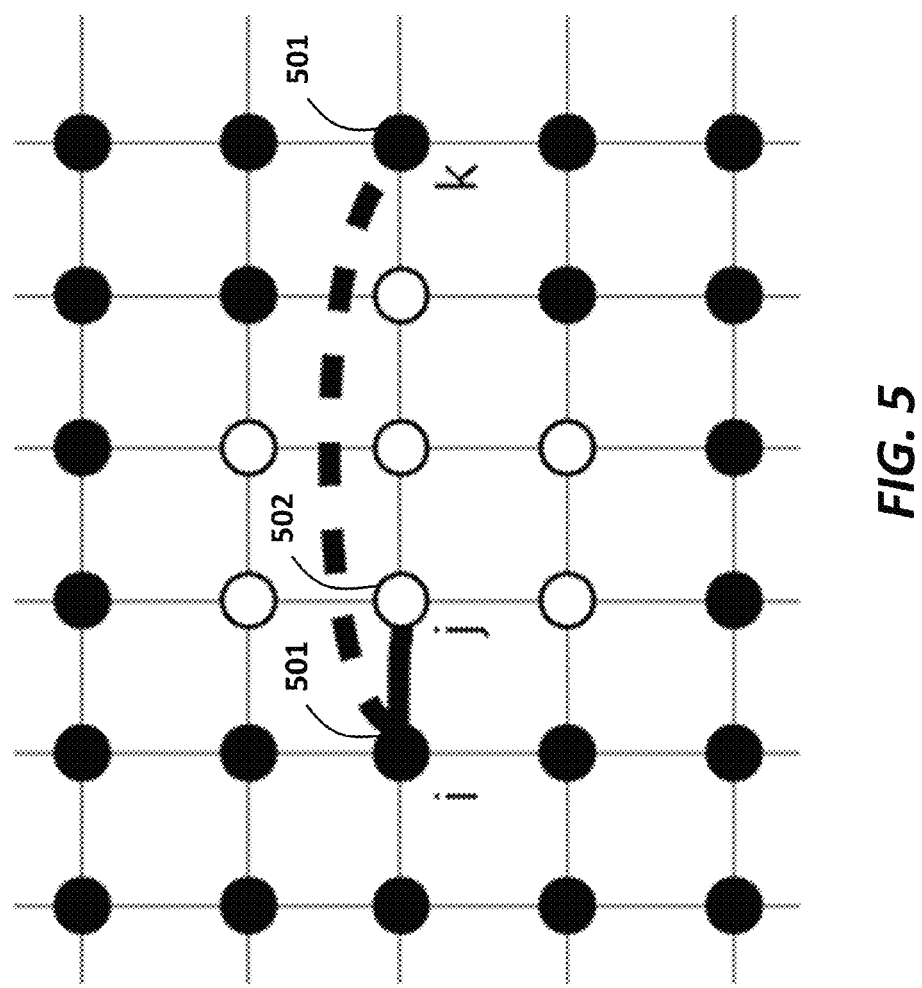
FIG. 5 is a schematic of a distance from a pixel, or a block of pixels, corresponding to a graph node without a motion vector.

FIG. 5 shows a portion of a graph that includes nodes i and k 501 with available MVs and a node j 502 with a missing MV. To calculate the distance between i and j, we search along an extended graph edge in a direction opposite to the direction from node j to node i to locate a node k that has a motion vector. If node k can be located, the representation point $R_j$ is replaced by $R_k$ and the distance between i and j is calculated using $R_i$ and $R_k$. Otherwise, if no pixel k is found, e.g. if the search for k ends at the image boundary, then we set the distance between i and j to be the maximal distance as in Equation (7). If both pixels i and j have no MV available, then the distance is set to 0. In this way, we can bring together the motion changes on each side of a Intra coded block and have such changes reflected in the graph weights near the object boundary.

2.2.5 Integrated Approach

Figure 6:
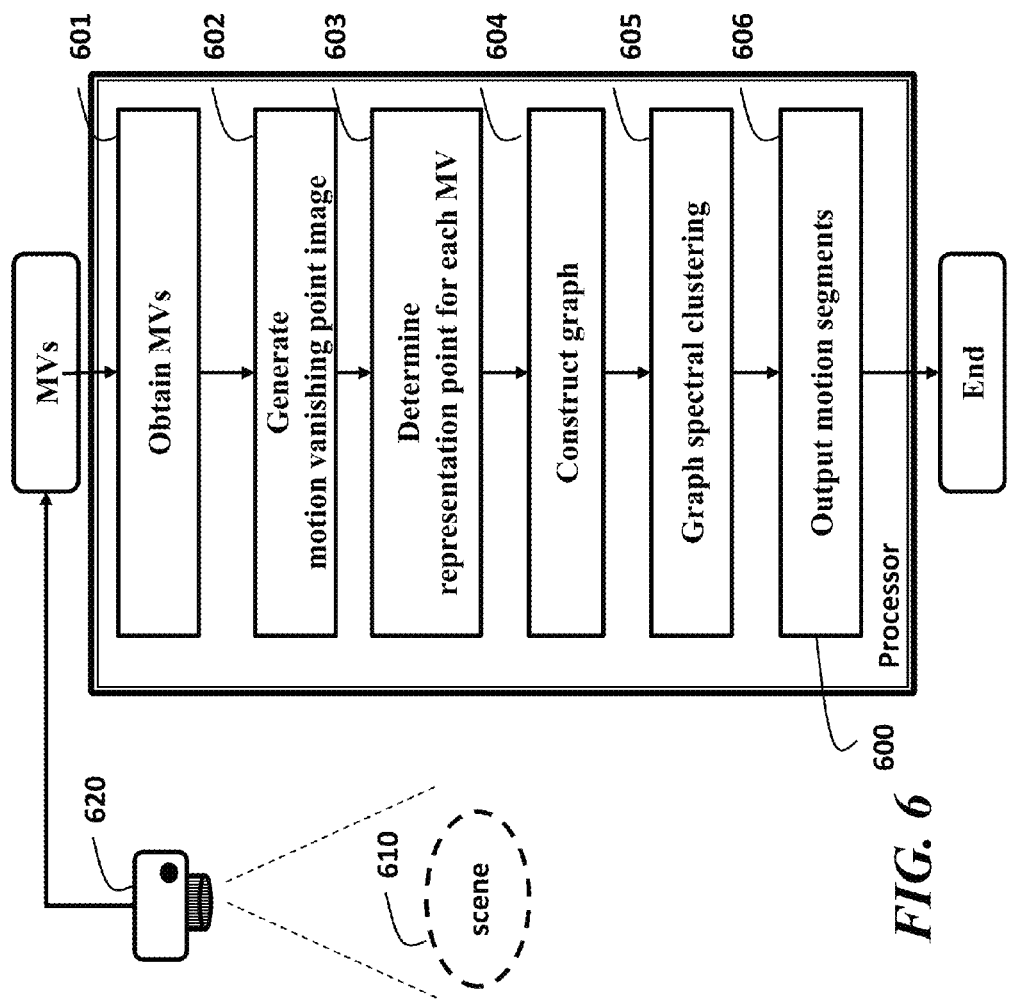
FIG. 6 is a flow diagram of a method for motion segmentation according to embodiments of the invention.

FIG. 6 shows the steps of our method.

Step 601: Obtaining vectors (MV) from an image of a scene 610 acquired by a sensor 620, e.g., a camera of depth sensor. The MVs can be extracted from an H.264/H.265 bitstream encoding the image, or a dense optical flow generator.

Step 602: Generate a motion vanishing point image. Each pixel in the motion vanishing point image represents a number of intersections of pairs of motion vectors at the pixel.

Step 603: Determine, in the motion vanishing point image, a representation point for each motion vector.

Step 604: Construct a motion graph including nodes connected by edges, wherein each node represents a motion vector, and each edge represents a weight based on the distance between the nodes.

Step 605: Perform motion segmentation on the motion graph using graph spectral clustering to produce segments of the image.

Step 606: Output the segmentation.

The above steps can be performed in a processor 600 connected to memory and input/output interfaces by buses as known in the art.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for segmenting an image acquired by a sensor of a scene, comprising steps of:
    obtaining motion vectors corresponding to the image of the scene;
    generating a motion vanishing point image, wherein each pixel in the motion vanishing point image represents a number of intersections of pairs of motion vectors at the pixel;
    determining, in the motion vanishing point image, a representation point for each motion vector;
    determining distances between the motion vectors based on the representation points;
    constructing a motion graph including nodes connected by edges, wherein each node represents a motion vector, and each edge represents a weight based on the distance between the nodes;
    performing graph spectral clustering on the motion graph to produce segments of the image; and
    outputting the segments, wherein the steps are performed in a processor.

2. The method of claim 1, wherein the motion vanishing point image is generated by using the intersections of all combinations of the pairs of motion vectors.

3. The method of claim 1, wherein the motion vanishing point image is generated by using the intersections for a first motion vector in the pair and all other motion vectors.

4. The method of claim 1, wherein the representation point is determined using the pixel with a maximal number of the intersections along a ray of the motion vector.

5. The method of claim 4, wherein the distances are Euclidean distances.

6. The method of claim 1, wherein multiple representation points are determined along a ray of the motion vector for local maximal number of intersections, and further comprising:
    determining, based on the local maximal number of intersections, a probability that the representation point is a vanishing point of the motion vector.

7. The method of claim 6, wherein the distances are based on the probabilities.

8. The method of claim 1, wherein the edges connect neighbouring nodes.

9. The method of claim 1, wherein edges connect nodes based on nearest distances.

10. The method of claim 1, wherein further comprising:
    filling missing motions vectors using an in-painting method.

11. The method of claim 1, wherein the graph includes a node i connected to a node j, wherein node i has a motion vector, and node j is without a motion vector, and further comprising:
    searching along edges, along a direction from node i to node j to locate a node k with a motion vector; and
    replacing a representation point $R_j$ with representation point $R_k$ and setting the distance between node i and j based on the representation points $R_i$ and $R_k$.

12. The method of claim 1, wherein the motion vectors are obtained from a compressed bitstream corresponding to the image.

13. The method of claim 1, wherein the motion vanishing point image is larger than the image.

14. A system for segmenting an image, comprising
    a sensor of a scene configured to the image of the scene; and
    a processor connected to the sensor, wherein the processor obtains motion vectors corresponding to the image, generates a motion vanishing point image, wherein each pixel in the motion vanishing point image represents a number of intersections of pairs of motion vectors at the pixel, determines, in the motion vanishing point image, a representation point for each motion vector and distances between the motion vectors based on the representation points, constructs a motion graph including nodes connected by edges, wherein each node represents a motion vector, and each edge represents a weight based on the distance between the nodes, and the performs graph spectral clustering on the motion graph to produce segments of the image.

* * * * *